W. E. PARKER.
AIR BRAKE APPARATUS.
APPLICATION FILED MAR. 29, 1913.

1,092,949.

Patented Apr. 14, 1914.

WITNESSES

INVENTOR
W. E. Parker,
by
Wilson, Attorney.

W. E. PARKER.
AIR BRAKE APPARATUS.
APPLICATION FILED MAR. 29, 1913.

1,092,949.

Patented Apr. 14, 1914.
7 SHEETS—SHEET 3.

W. E. PARKER.
AIR BRAKE APPARATUS.
APPLICATION FILED MAR. 29, 1913.

1,092,949.

Patented Apr. 14, 1914.
7 SHEETS—SHEET 5.

WITNESSES

INVENTOR
W. E. Parker,
by
Attorney

W. E. PARKER.
AIR BRAKE APPARATUS.
APPLICATION FILED MAR. 29, 1913.

1,092,949.

Patented Apr. 14, 1914.
7 SHEETS—SHEET 6.

WITNESSES

INVENTOR
W E Parker,
by
Attorney.

W. E. PARKER.
AIR BRAKE APPARATUS.
APPLICATION FILED MAR. 29, 1913.

1,092,949.

Patented Apr. 14, 1914.
7 SHEETS—SHEET 7.

WITNESSES

INVENTOR
W. E. Parker,
by Attorney.

UNITED STATES PATENT OFFICE.

WILLIAM E. PARKER, OF MANNING, TEXAS.

AIR-BRAKE APPARATUS.

1,092,949.   Specification of Letters Patent.   Patented Apr. 14, 1914.

Application filed March 29, 1913. Serial No. 757,723.

*To all whom it may concern:*

Be it known that I, WILLIAM E. PARKER, a citizen of the United States, and residing at Manning, in the county of Angelina and State of Texas, have invented certain new and useful Improvements in Air-Brake Apparatus, of which the following is a specification.

This invention relates to improvements in air brake apparatus and relates not only to a new system of air brakes but also to a new form of engineer's valve and triple valve especially designed for forming a part of the working system.

Among the many objects of the invention is the provision of an air brake construction adapted for making a straight air charge to the brake cylinder for a straight air application and provided simultaneously therewith for a re-charging of the auxiliary reservoir, the auxiliary reservoir being at the same time open to the brake cylinder while the air in the brake cylinder upon the combined application remains under pressure until it is released by the engineer's valve.

A further object is to provide a system in which by means of a manipulation of the engineer's valve, the triple valve is positioned for allowing an application to the brake cylinder of air from the auxiliary reservoir and simultaneously therewith providing for a re-charging of the auxiliary reservoir and constituting the service application.

A still further object is to provide an automatic emergency application of the brakes by positioning the triple valve through the agency of the engineer's valve so as to allow direct air from the train pipe to enter the brake cylinder at the same time that the auxiliary reservoir is opened thereto, said auxiliary reservoir being shut off from re-charging.

A still further object is to provide an engineer's valve of such a construction that in one position thereof a direct passage is provided therethrough from the main reservoir to the train pipe, a second position in which a small amount of air only is admitted to the train pipe from the main reservoir and a third position in which the train pipe is exhausted to the atmosphere.

Among the further objects of the invention is the provision of an emergency check and a releasing catch device within a triple valve structure, the former pneumatically controlling applications of direct air to the brake cylinder and the latter consisting of a pneumatically operated catch for the triple valve proper.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating numerals refer to corresponding parts throughout the several views: Fig. 10 is a vertical detail sectional view taken upon line 10—10 of Fig. 6. Fig. 11 is a bottom plan view of the main slide valve of the triple valve, and, Fig. 12 is a top plan view of the seat for the slide valve of the triple valve structure.

Figure 1:
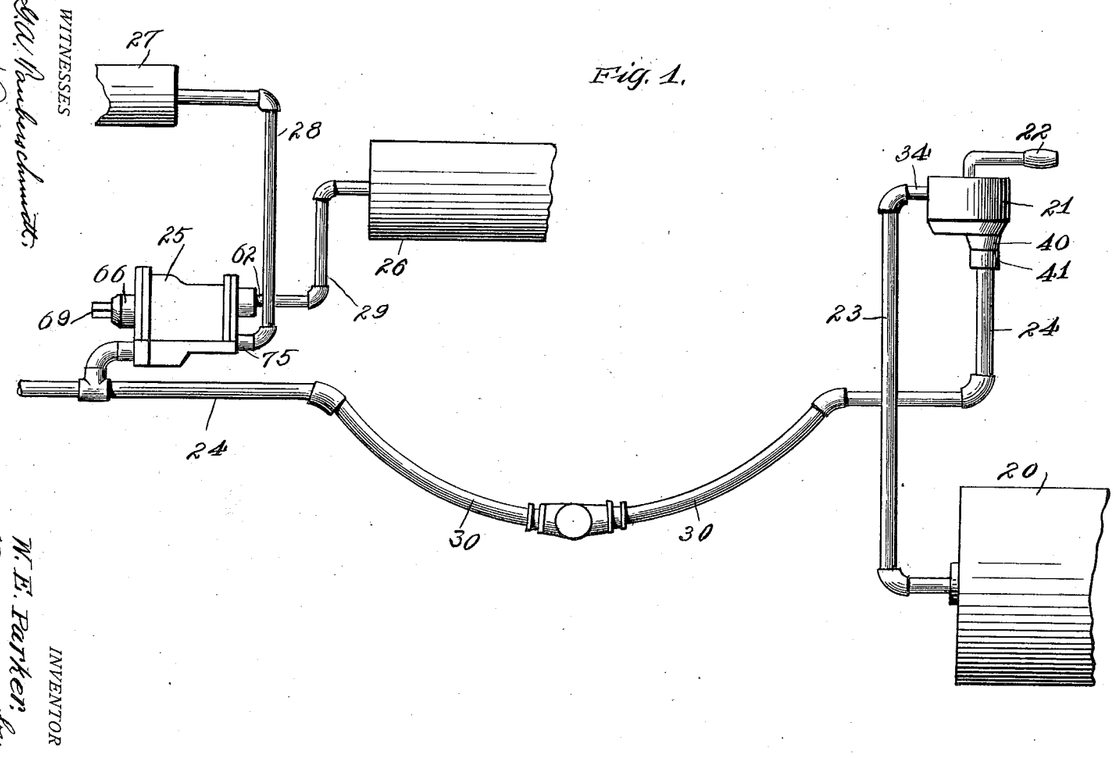
Figure 1 is a view illustrating the arrangement of the present apparatus and piping employed upon a locomotive and tender, the apparatus and piping for each car of the train being identical to that herein shown for the tender.

Referring more in detail to the drawings, it will be noted that the general arrangement of the air brake apparatus both upon the locomotive and the train as shown in Fig. 1 of the drawings is substantially the same as that provided in the engine and tender equipment of the air brake systems now in use. In said figure, the main air reservoir 20 positioned upon the locomotive is supplied with air by an air pump (not shown) and the pressure within which reservoir is automatically controlled by a pump governor of the usual construction and which it is not necessary to illustrate.

The engineer's valve 21, being of the present novel construction and operated by the controller handle 22, is in communication through the inlet pipe 23 and stub pipe 34 with the main reservoir 20 while the train pipe 24 connects said engineer's valve with my devised form of triple valve 25, the connection of the pipe 24 with the engineer's valve being through the boss 40 and the union 41 on the bottom of the casing 31. Broadly speaking a manipulation of the controller handle of the engineer's valve governs the complete operation of the present brake system through the agency of the triple valve mechanism now devised and herein described. The piping 28 is provided between the triple valve and the brake cylinder and the piping 29 between the auxiliary reservoir and the triple valve, while the usual hose couplings 30 are arranged in the train pipe 24.

While the main functions of the present construction of engineer's valve are the same as those found in other air brake systems, the specific arrangement of elements therein differs considerably from other forms of engineer's valve and the same results in the novel objects attained by the present complete apparatus when combined with the special form of triple valve adapted thereto and which will be hereinafter fully described.

The engineer's valve 21 consists primarily of the valve casing 31 having a cylindrical chambered recess 32 therein, the latter being closed by a top cap 32' secured in position by hold-fast devices 33. A stub pipe 34 communicates with the chamber 32 and is connected to the inlet pipe 23 for conducting air from the main reservoir 20. The valve casing is provided through the bottom of the chamber 32 with a vertical port 35 opening to the atmosphere at the port 36 in the side of the valve casing. Another vertical passage 37 leads from the chamber 32 through the bottom thereof to a horizontal passage 38 which connects with the vertical passage 39 in the boss 40 of the valve casing and to which the train pipe 24 is coupled as by means of the union 41. A bore 42 vertically positioned in the lower portion of the valve casing seats the valve 43 over the inlet end thereof of the small passage 44 leading from the chamber 32 through the bottom thereof, said valve being held normally closed by the spring 45, the tension of which may be regulated by the screw plug 46. A communicating passage 47 affords communication between said valve bore 42 and the vertical passage 37 hereinbefore described which leads to the train pipe. The cut-out valve 120 is threaded in the casing of the engineer's valve so as to intercept the bore 47 and by turning the handle 121 assist the air regulation. A rotary valve 48 is seated within said chamber 32 engaging the bottom thereof and is mounted for revolution upon the stub pin 49 and the stem 50 of the handle 22 which stem extends through and is journaled in said cover cap 32' being secured to the handle by the nut 122. A vertical cylindrical passage 51 is provided through the rotary valve 48 and which upon a movement of the latter by the handle 22 may be brought into registry with the vertical passage 37 of the valve body and at which time the main reservoir is opened directly with the train pipe passage 39 through the stub pipe 34, the chamber 32, the passages 51, 37, and 38. For convenience in operation, the upper portion of the rotary valve is cut-away forming slanting walls 52 to receive the air pressure from the main reservoir over the entire top of the rotary valve. The under surface of the rotary valve is provided at a point diametrically opposite to the passage 51 with an elongated chamber 53 which is adapted to be brought into registry with the opening 54 where the train pipe passage 39 is tapped into the chamber 32 through the bottom thereof and at which time it also registers with the outlet passage 35 to the atmosphere. By this arrangement, it will be noted that with such a positioning of the chamber 53 by a manipulation of the handle 22 of the valve, the train pipe is opened as much as desired to the atmosphere through the port 36. A relatively small vertical passage 55 is provided through the rotary valve in radial alinement with the passage 51 and chamber 53, said smaller passage being adapted to form communication between the chamber 32 and the passage 44 of the valve body and whereby a relatively small amount of air is conducted from the main reservoir therethrough and through the passage 44, the valve bore 42 and the passage 47 to the passage 38 from whence it is conducted through the train pipe passage to the train pipe. By this arrangement under the designed manipulation of the controller lever 22, a small amount of air from the main reservoir is conducted direct to the train pipe.

Figures 2, 3, 13:
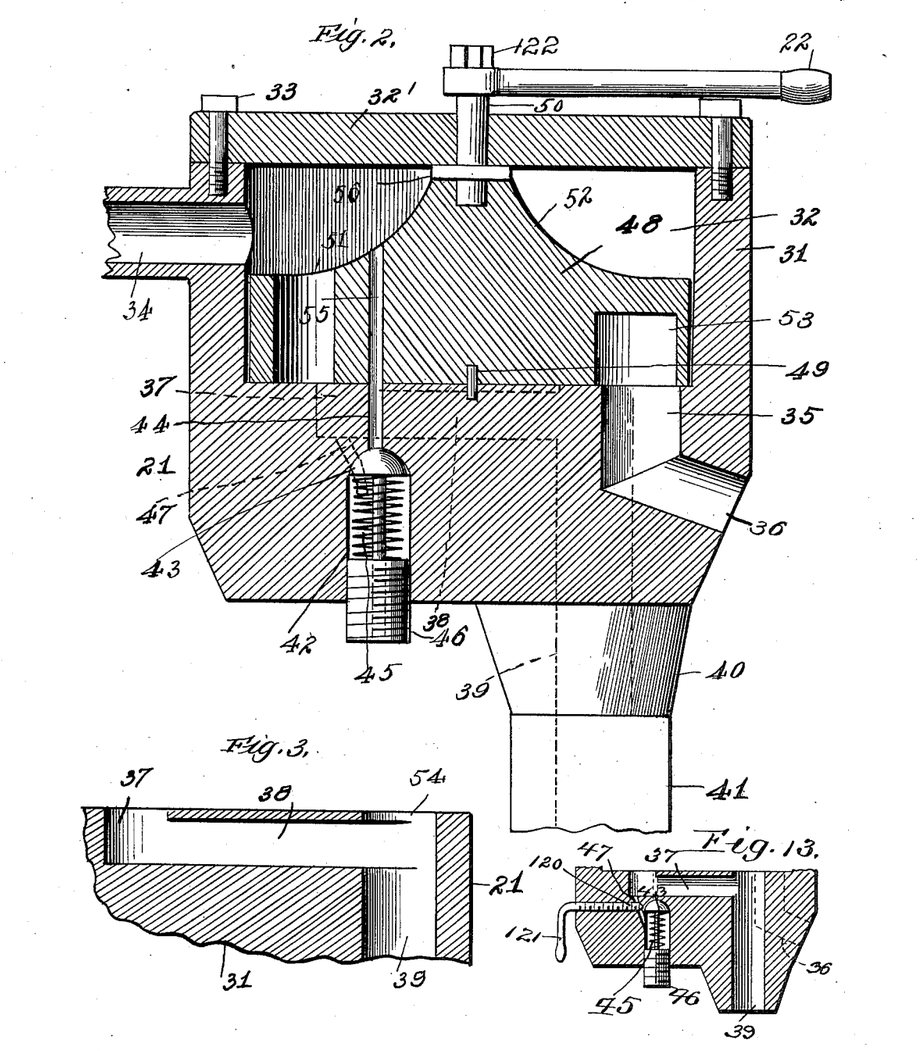
Fig. 2 is a vertical central sectional view taken through the engineer's valve of my construction.
Fig. 3 is a vertical sectional detail view through the train pipe connecting port of the valve body.
Fig. 13 is a detailed view of a port cut-out employed in the engineer's valve.
Figure 4:
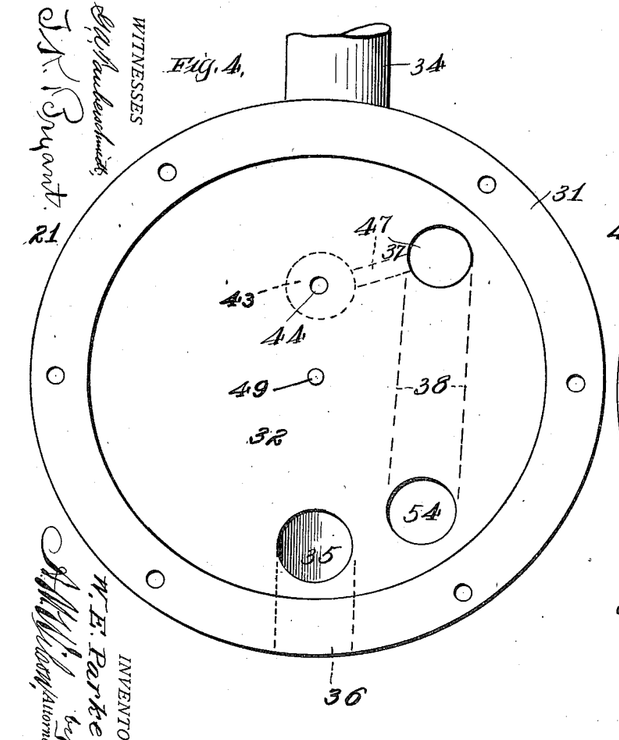
Fig. 4 is a top plan view of the engineer's valve body with the cover and operating valve removed therefrom.

It is to be noted that the rotary valve 48 while capable of turning through the agency of the handle 22 affords a sufficiently close contact with the bottom of the chamber 32 by reason of the washer 56 integral with the stem 50, to prevent any leakage of air through any of the passages tapped into the bottom of the chamber 32 except of course at the times of the predetermined registration therewith of the chamber with one of the passages of said rotary valve.

Figure 6:
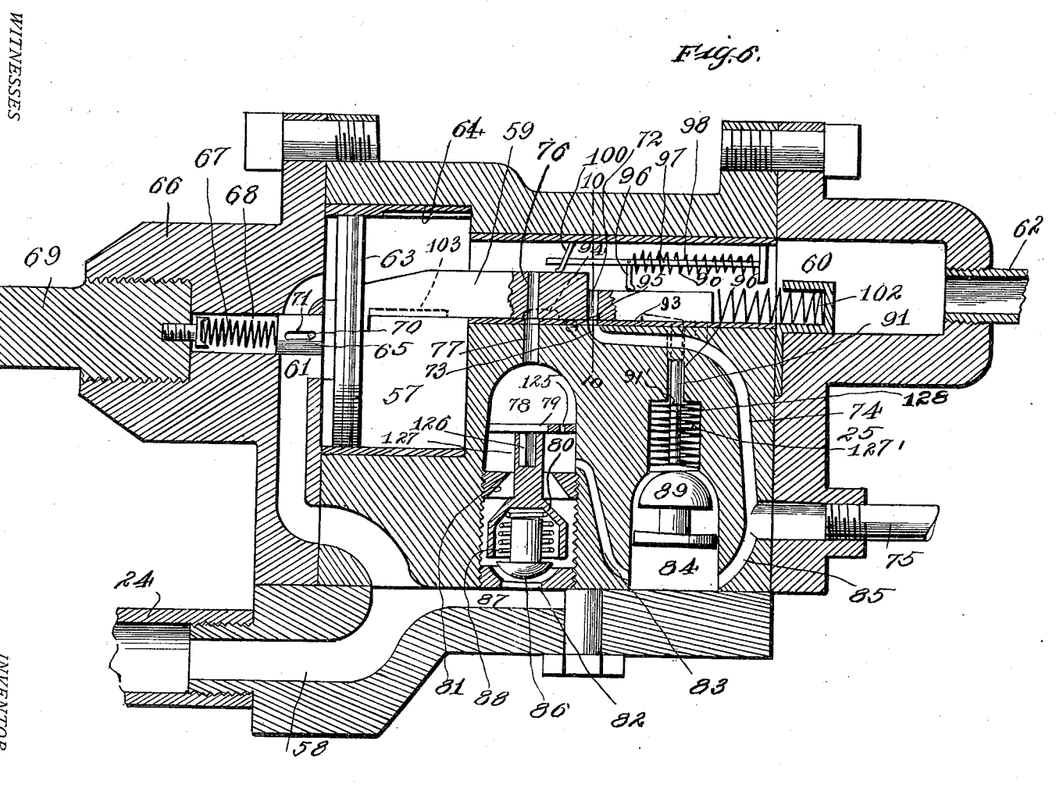
Fig. 6 is a vertical central sectional view of my triple valve with the parts shown in the automatic emergency position with the brakes set by the combined force of air taken direct from the train pipe and also from the auxiliary reservoir.
Figure 7:
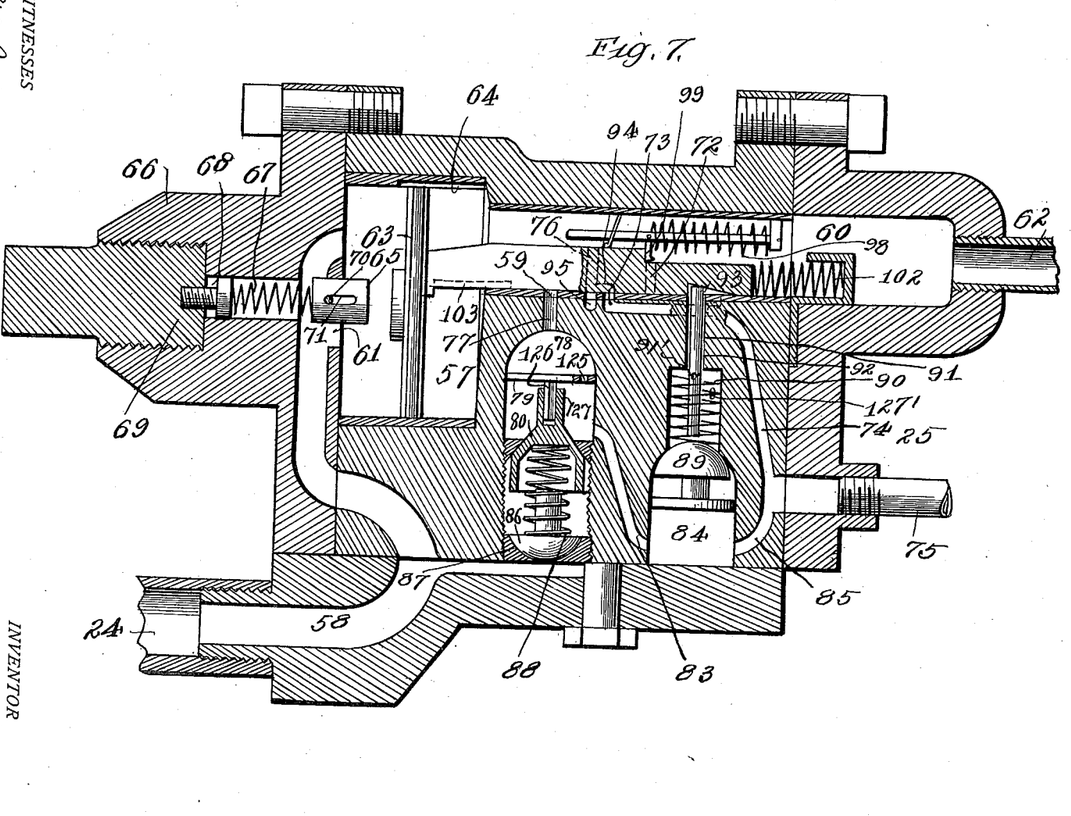
Fig. 7 is a similar view of my triple valve with the parts shown in their normal releasing, re-charging, and running position.
Figure 8:
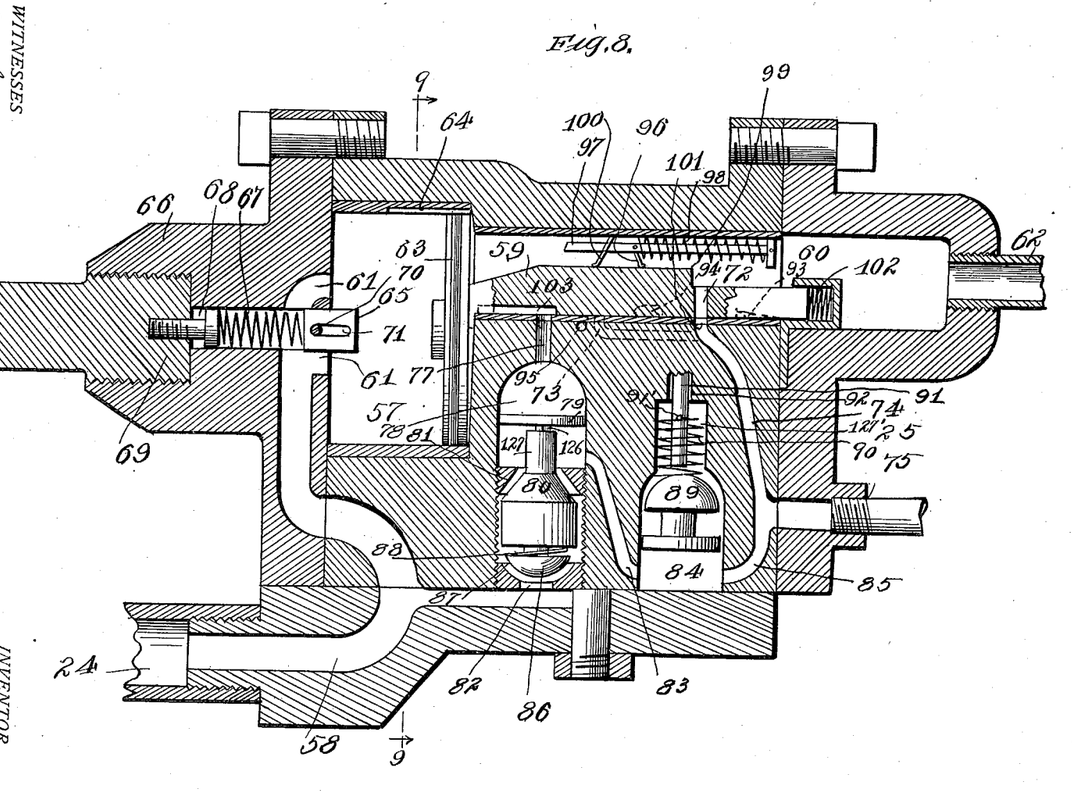
Fig. 8 is a further similar view of said valve with the brakes set by a combined automatic and straight air simultaneously with a re-charging of the auxiliary reservoir.
Figure 9:
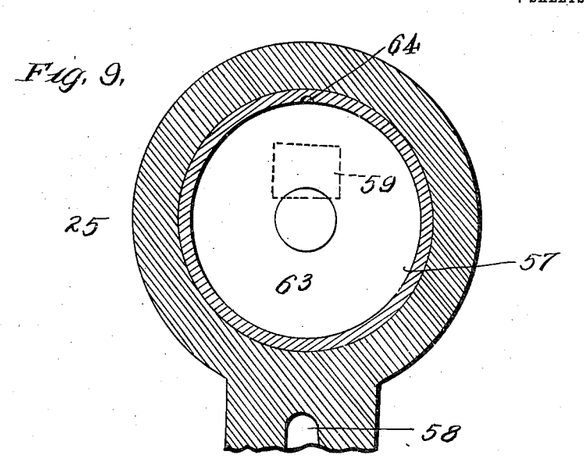
Fig. 9 is a detail vertical sectional view taken upon line 9—9 of Fig. 8.

*Triple valve.*—The three regular positions of my triple valve may be termed, (1) emergency application position, (2) running position, and (3) service application position, and the arrangement of the triple valve mechanism for each of said positions is illustrated respectively in Figs. 6, 7, and 8 of the drawings which will be now described.

The triple valve 25 is provided with the valve chamber 57 to which communication is had from the train pipe 24 through the conduit 58 of the valve casing. The slide valve 59 is mounted within the chamber 57 and the horizontal extension 60 of said chamber, said train pipe entrance 61 being at one end thereof while at the opposite end is positioned the inlet pipe 62 from the auxiliary reservoir 26. The slide valve 59 being provided with a head 63 fitting within the chamber 57, is adapted for reciprocation by reason of the difference in air pressure exerted upon the opposite sides of said head 63 by air from the main reservoir through the train pipe and conduit 58 and by air from the auxiliary reservoir entering by the inlet 62. The chamber 57 has a groove 64 extending for a portion of its length in its side wall at the top of the chamber and contiguous to the inner end thereof. With the position of the slide valve head as shown in Fig. 6, it is evident that the air entering the port 61 will not be able to pass by the head 63 but upon a movement of the head to a position opposite the groove 64, it will be seen that the air from the train pipe may then pass the head 63 and thence through the chamber 60 and pipe 62 to the pipe 29 and thence into the auxiliary reservoir 26 for recharging the same.

A buffer 65 is slidably-mounted in the valve extension 66 being normally pressed inward by the expansion spring 67 within the bore 68, the tension of said spring being regulated by means of the screw plug 69 and the movement of said buffer being limited by the pin 70 upon the casing positioned within the slot 71 of the buffer. This buffer limits the outward movement of the slide valve, the head of which comes in contact therewith upon an emergency application and yields to the impact of a sudden movement of the slide valve upon this application of the air pressures.

Referring to the emergency position of the elements of the triple valve as illustrated in Fig. 6, it is noted that a reduction in pressure in the train pipe is accomplished suddenly and to any number of pounds reduction desired by moving the controller handle 22 to open up the train pipe direct to the atmosphere by bringing chamber 53 into registry with the atmosphere passage 35 and the top opening 54 of the train pipe passage 39. This suddenly reduced pressure in the train pipe forwardly of the slide valve head 63 in the chamber 57 results in a sudden forward movement of the slide valve under the influence of the air pressure from the auxiliary reservoir through the inlet 62, the elements taking the position shown in Fig. 6. In this position of the slide valve 59, the vertical transverse port 72 is brought into alinement with the port 73 of the passage 74 leading to the brake pipe 75 communicating with the pipe 28 forming the inlet to the brake cylinder 27. Such a positioning therefore of the slide valve port 72 results in admitting automatic air from the auxiliary reservoir into the brake pipe and thence to the brake cylinder for setting the brakes. Another vertical transverse port 76 is provided through the slide valve and adapted to communicate with the vertical passage 77 of the valve casing which passes to the chamber 78 within which is positioned the emergency check valve. An admission of air from the auxiliary reservoir through said passages 76 and 77 to the chamber 78 is accomplished simultaneously with said admission of air to the brake pipe above noted and whereby the piston 79 is adapted to be depressed for forcing the valve 80 downwardly and off of its seat 81 and whereby air may be admitted from the train pipe conduit 58 through the valve passage 82 and upwardly through this emergency valve to the passage 83 from whence it is conducted to the releasing valve chamber 84 and outwardly therefrom through the passage 85 and into the brake pipe 75 to unite with the air from the auxiliary reservoir in setting the brakes by the united force exerted in the brake cylinder.

In the emergency position the emergency check valve 80 allows a small flow of air out of the train pipe and into the brake cylinder when the air from the auxiliary reservoir forces downwardly the piston 79 unseating said valve 80 which is made possible as the train pipe pressure at all times is under the bottom check valve 86 having the seat 87 and upon which it is seated by the spring 88 when the air pressure in the train pipe and conduit 58 becomes sufficiently reduced. The emergency valve 80 is not unseated until the auxiliary reservoir air pressure forces the piston 79 downwardly and as soon as the pressure lessens in the train pipe in the emergency application of brakes, the check valve 86 seats itself under the force of the spring 88 which together with the back pressure from the brake pipe prevents any possible leakage of air out of the brake cylinder.

The releasing catch device is not material for the operation in the emergency application and it is only necessary to note that the pressure through the brake pipe from the brake cylinder in the chamber 84 forces upwardly the vertically slidable body 89 compressing the spring 90 which gives an upward tendency to the stem 91 within the bore 92 of the valve casing and thus forces said stem against the lower face of the slide valve 59 and adjacent the stop notch 93 of said slide valve. A transverse pin 91' through the stem 91, which is separate from the body 89, is engaged by the encircling spring 90, and normally holds apart the stem 91 and the body 89.

To prevent the entire discharge of the auxiliary reservoir into the brake cylinder, it is noted that the reduction of pressure from said cylinder within the chamber 57 will allow the train pipe pressure with the buffer spring 67 to unitedly act to force inwardly the head 63 and the slide valve 59 until the slide valve assumes a position approaching that shown in Fig. 7 between the emergency and the service application positions and with none of the vertical ports registering and with the head 63 contacting the buffer 65, which is at the limit of its inward travel. The valve is adapted to remain in said last-named position normally and until again affected by the intended variation of pressure in the train pipe caused by the operation of the engineer's valve. It is noted that in this emergency application position that the brake cylinder is thus given the effect of air from both the auxiliary reservoir and from the train pipe while there is no connection resulting whereby the auxiliary reservoir is re-charged during this application.

It is noted that in the event that a break occurred in the train pipe or should the hose become uncoupled by separating the train or for other reasons, the suddenly reduced pressure in the train pipe will at once place the triple valve in the emergency application position and thus instantly setting the brakes.

When the brakes are set by the emergency application, a release of the brakes is effected by moving the engineer's valve so that the passage 51 admits air direct from the main reservoir stub pipe 34 through the passages 37 and 38 to the train pipe passage 39 and whereby the pressure is restored in the train pipe to overcome the air pressure in the chamber 57 derived from the auxiliary reservoir and whereupon the slide valve is moved to the right against such auxiliary reservoir pressure to its normal or running position as shown in Fig. 7.

A purpose of the emergency valve, so-called, is to equalize the train pipe and auxiliary reservoir-air pressure during any application of the brakes by discharging into the brake cylinder the pressure in the train pipe. The piston 79 is provided with a small perforation 125 therethrough for the purpose of relieving the air pressure upon both sides of said piston when the brakes are released while the perforation is so small in diameter as to in no manner interfere with the valve operation of the mechanism. As noted, to unseat this check valve, air must enter above the same coming from the auxiliary reservoir through the port 77, which pressure drives downwardly the piston 79 until its sliding stem 126 within the sleeve 127 of the valve 80 engages the same and forces said valve downwardly, unseating the said valve 80 from the seat 81 and at which time the air pressure out of the train pipe conduit 58 easily unseats the spring-pressed check 86 from its seat, the air passing through both of the valves 86 and 80 and into the port 83, and thence to the brake cylinder. It is noted that the spring 88 has a tendency to seat both of the valves 80 and 86 which spring also retains said check valve members in proper relative position. In the catch structure, the small port 127' to the atmosphere relieves any air pressure in this part of the chamber which would interfere with the upward operation of the body 89 by the air pressure from the brake cylinder, it being noted that whenever such pressure is removed, the releasing body 89 falls to unseated position by reason of its own weight.

With the triple valve in the emergency application position either the reducing of the pressure from the auxiliary reservoir coupled with the action of the buffer spring or an increase in pressure in the train pipe will force the triple valve to the running or intermediate position. A movement and positioning of the engineer's valve to allow the main reservoir air pressure to enter the train pipe through the small valve port 55 places the engineer's as well as the triple valve in proper position for releasing, re-charging, and running. Primarily, such an inward movement toward the right of the slide valve and its head positions the bottom chamber 94 of said valve over the port 73 of the passage to the brake pipe and also over the outlet port 95 to the atmosphere. It is apparent that this connection with the atmosphere of the passage 94 allows the air in the brake cylinder to escape therethrough and thereby releases the brakes. It will also be noted by referring to Fig. 7 that in this normal position of the slide valve, the groove 64 is left free for the passage of air from the train pipe through the chambers 57 and 60 and thence to the auxiliary reservoir for re-charging the same. Such movement of the slide valve positions the same so that the stop shoulder 93 rests against the end of the stem 91, said stem being forced upwardly by pressure in the brake cylinder through the passage 85 and under the bottom of the releasing body 89, and at which time the body 89 is at the limit of its upward movement, while the stem 91 being projected upwardly by its spring 90 is slightly elevated above the top of said body. The slide valve is also resting against the lug 96 of the plunger 97 of the guide spring 98 which lug is contacted by the shoulder 99 of the slide valve. The exhausting of the pressure from the brake cylinder and likewise from the chamber 84 beneath the releasing body allows the body 89 to fall and the stem 91 also lowering leaves the entire mechanism and slide valve at perfect rest with the slide valve shoulder against said spring lug 96 which spring arrangement retains the slide valve in this releasing and re-charging position under normal conditions, a change in pressure upon either side of the valve head then effecting either the emergency or service application of the brakes. In this position the emergency check valve 80, 86 allows no flow of air therethrough in either direction.

Figures 10, 11, 12:
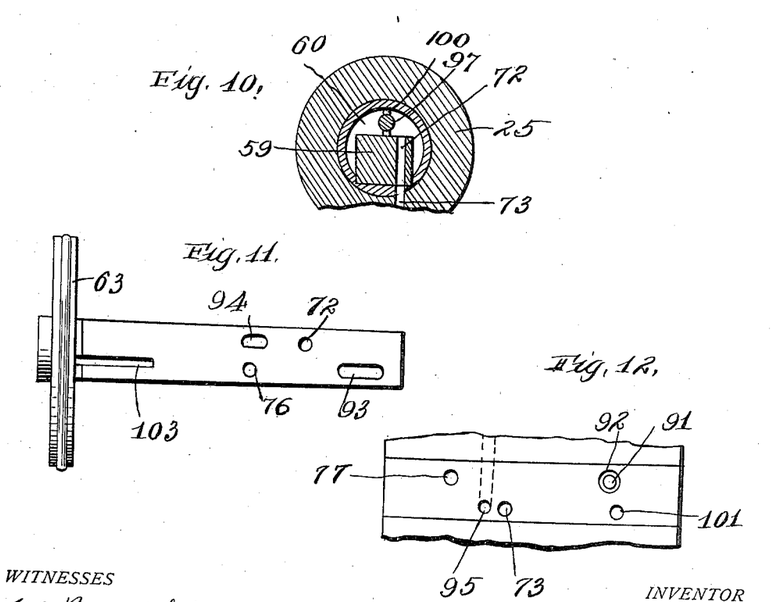

In the service application of the brakes as shown in Fig. 8, the same is effected by a movement of the engineer's valve so as to directly admit the main reservoir air through the large valve passage 51 to the passage 37 and through passages 38 and 39 to the train pipe which results in forcing the slide valve and head 63 to the extreme inner or right hand position as shown in Fig. 8. In this position, it will be noted that the groove 64 affords free passage of air from the train pipe to the auxiliary reservoir for re-charging the same. In this position the releasing valve is inoperative. While the lug 96 which is pivoted to the carrying rod 97 rides over the shoulder 99 to a position upon the top of the slide valve 59 and together with the leaf spring 100 which straddles the rod 97 more firmly holds the slide valve down upon the valve seat shown in detail in Fig. 12. In this position of the slide valve, the port 72 thereof is brought into registry with the opening 101 of the passage 74 so that air from the auxiliary reservoir is allowed to pass through the passages 72 and 74 to enter the brake pipe 75 and thereby enter the brake cylinder for setting the brakes. In this service position also, the air from the train pipe may be conducted to the brake cylinder to apply the brakes and at the same time to charge the auxiliary reservoir after this application or between applications of straight air and without releasing the brakes. The slide valve passes over the stem 91 before the air enters the port 101. At the beginning of the movement from running to the service position, the slide valve was resting against the spring lug 96. Said spring arrangement being only strong enough to stand under normal conditions any excess in pressure toward the right as viewed in Fig. 7 causes the lug 96 which is pivoted to the rod 97 to move to the top of the slide valve as shown in Fig. 8. To prevent the full charge of air from entering the brake cylinder, a spring device which is located at the right end of the slide valve and designated 102 is adapted to force the slide valve port 72 from over the inlet 101 gradually as the air pressure decreases. In this position, the emergency check valve 80 is depressed by air pressure from both conduits 62 and 64 passing by way of the bottom cavity 103 to the port 77 and is retained unseated by such pressure. An excess of pressure in the train pipe will force the check valve 86 open and thus admit straight air to the brake pipe through the emergency check and the releasing valve cylinder, said air coming straight through the engineer's valve, from main reservoir. In this service application position therefore, the brakes are set by the application of air from the auxiliary reservoir and united with some straight air from the train pipe when desired while the train pipe is open to the auxiliary reservoir for re-charging the same. To release this service position application requires only a slight reduction of pressure in the train pipe by operating the engineer's valve to shut off the supply of air to the train pipe and to partially open the same to the atmosphere, all of which will move the slide valve to the normal running position and with the shoulder 93 against the stem 91 and with the lug 96 in contact with the shoulder 99. Should the train pull apart during the service application, the sudden reduction in pressure in the train pipe will at once result in the automatic emergency position application. The chamber 103 is open to the chamber 60.

*The operation.*—The positions of my improved triple valve and engineer's valve have been fully described and will now be well understood in their relations with the other elements of the system. The invention having mainly to do with the triple valve, the same is illustrated in the separate views in the three main positions taken during the operation of the system and the operation will now be described in connection with these three views by explaining the different adjustments of the engineer's valve to bring about such positions of the triple valve and the effect upon the system of such triple valve positions.

Figure 5:
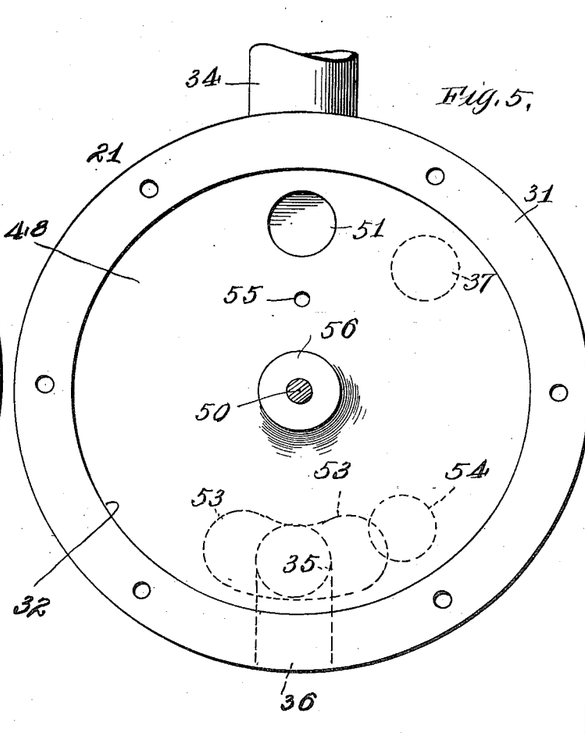
Fig. 5 is a view similar to Fig. 4 with the operating valve shown in plan view and positioned therein.

*The emergency application.*—Fig. 6 of the drawings illustrates the emergency application position of the triple valve. The train pipe 24 is connected to communicate with the air passage 39 of the engineer's valve by the couplings 40, 41, while a port 54 establishes communication with the chamber 32 and is so positioned that a movement of the engineer's valve 48 may place the bottom cavity 53 of said valve over the port 54 and at the same time over the open end of the outlet passage 35 leading to the exhaust port 36 as best illustrated in Fig. 5. Such a positioning of the engineer's valve establishes communication between the train pipe and the atmosphere whereby any desired amount of reduction in the train pipe pressure is brought about. Such operation of the engineer's valve results in placing the mechanism of the triple valve in the emergency application position as shown in Fig. 6, it being apparent that by reducing the air pressure at the inlet side of the slide valve head 63, at the inlet 61, the air pressure from the auxiliary reservoir 26 entering the chamber 60 by the pipe 62 by reason of the same being in excess of the pressure in the train pipe and exerting its force upon the opposite or forward face of the slide valve head 63 forces the slide valve and head to the extreme forward position illustrated. In this position of the slide valve, the port 72 thereof is brought into alinement with the entrance 73 of the passage 74, thereby conducting air from the auxiliary reservoir to the brake pipe 75 and thus setting the brakes. This position of the slide valve also places the port 76 thereof in communication with the chamber 78 through the passage 77 which allows the auxiliary reservoir pressure to enter therein and depress the valve 80 from its seat 81 thereby opening the passage 83 which communicates through the passage 85 with the brake pipe 75 so that the air from the train pipe upon elevating the check valve 86, may pass directly to the brake pipe and thereby aiding the auxiliary reservoir pressure in setting the brakes. The amount of reduction in the train pipe pressure is regulated by controlling the amount of air exhausted through the engineer's valve and in this manner, the speed of the movement of the brakes is regulated. An increase in the air pressure in the train pipe so as to exceed the auxiliary air pressure moves the slide valve inwardly and the registering ports out of alinement.

*The re-charging-releasing position.*—Fig. 7 of the drawings illustrates the re-charging-releasing position of the triple valve. The main reservoir communicates to the chamber 32 through the pipe 34 and by turning the valve member 48 the vertical port 51 thereof may be brought in alinement with the entrance 37 of the passage 38, thus effecting communication between the main reservoir, the passages 38 and 39 and the train pipe 24. Such communication may be made only slight by regulating the degree with which the passage 71 communicates with the opening 37 or preferably, the valve member 48 may be positioned with the small vertical port 55 communicating with the passage 44 and thus by opening the check valve 43, allowing a small amount of air to pass by way of the passage 47 to the passage 38, and thus to the train pipe. Limited pressure having been thereby brought upon the outer face of the head 63 the slide valve is moved inwardly, bringing the bottom cavity 94 of said valve in communication with the outlet 95 and the port 73 of the passage 74 and whereby the air in the brake pipe 75 is exhausted to the atmosphere, thus releasing the brakes. By regulating the screw plug 46, the pressure regulating valve 43 is set to allow any desired air pressure to pass through into the auxiliary reservoir.

It is to be noted that the air pressure in the chamber 84 beneath the body 89 controlled by the pressure of the brake pipe 75 maintains the body 89 and its stem 91 in the extreme uppermost position while the brakes are set, so that upon said inward movement of the slide valve from the position shown in Fig. 6, the stem 91 enters the notch 93 of the slide valve and limits the inward movement of the valve at the proper time to bring said chamber over the said ports. At this time also, the passage 76 will be out of alinement with the passage 77 thereby breaking communication to the emergency valve which becomes seated. The releasing of the brakes in this position has been noted, and it will be also seen that the air from the inlet 61 may freely pass through the groove 64 and thus to the auxiliary reservoir, thus re-charging the auxiliary reservoir during the releasing of the brakes. Upon a complete releasing of the brakes, the pressure from the brake pipe having allowed the pressure in the chamber 84 to reduce, permits the body 89 and its stem 91 to drop of its own weight and release the stem from the notch 93 and whereupon the slide valve having been completely stopped in its movement by the stem 91, will be resiliently maintained at substantially the same position by the spring 98 and in a substantially balanced position to be acted upon by any change in air pressure upon either side of the head 63.

*The service application position.*—Fig. 8 illustrates the service application position of the triple valve. The pipes 23 and 34 establish direct communication between the main reservoir and the chamber 32 of the engineer's valve and the air pump with its pressure governor tend to maintain a normal pressure of the air therein. By turning the valve member 48 to bring the vertical port 51 thereof in direct alinement with the opening 37 of the passage 38, it will be seen that a direct pressure from the main reservoir is communicated to the train pipe through the passage 39 and that this pressure is brought upon the outer face of the slide valve head 63 of the triple valve. This effects a sudden movement of said slide valve inwardly to the position shown in Fig. 8. This position of the slide valve brings the bottom cavity 103 thereof, which is open, to the auxiliary air pressure in the chamber 60, in alinement with the passage 77, thus conducting air to the emergency valve and depressing the member 80 to open the passage 83 which by reason of the air entering at 82 and unseating the check valve 86 conducts the air from the train pipe to the brake pipe 75, and thus to the brakes setting the same. As direct communication is thereby established between the main reservoir and the brake cylinder, the air pressure in the brake cylinder will be the same as that in the main reservoir so that the pump maintaining a pre-determined pressure in the main reservoir likewise maintains the same in the brake cylinder. This position of the triple valve also brings the air pressure from the auxiliary reservoir into the brake cylinder by bringing in alinement the valve port 94 and the opening 101 of the passage 74 which communicates with the brake pipe 75. In this position also, the auxiliary reservoir is being recharged by the passage of air from the train pipe through the passage 64 and the chamber 60. We therefore have in the service application position of the triple valve, a setting of the brakes by air direct from the main reservoir and by air from the auxiliary reservoir and simultaneously with a re-charging of the auxiliary reservoir by the pump. There should however be noted what is known as the lap position. In this position, the slide valve and related parts are placed at an intermediate point between the positions assumed in the emergency and the running positions of Figs. 6 and 7 respectively. Both the triple and engineer's valve are in a position to permit utilization of the air for either recharging, discharging, receiving, or exhausting. With the slide valve positioned through the agency of the engineer's valve as shown in the emergency application of Fig. 6, a certain reduction of pressure within the chamber 57 allows the buffer spring 67 to force inwardly the head 63 and the slide valve 59 until the port 72 passes out of registering position with the port 73 but not far enough to release the brakes by exhausting the air through the outlet port, such a position being as above set forth and termed the lap position. It will be noted that while Fig. 1 illustrates the arrangement of the apparatus, that obvious changes may be made therein such as to fit the triple valve directly to the auxiliary reservoir and this may be accomplished by omitting the end cap of the triple valve. Such assembling will accord more closely with the present system employed with freight car service.

The valve 43 of the engineer's valve regulates the flow of air into the train pipe by way of the passage 39 and a cut-off valve 120 shown in Fig. 13 also assists this regulation of air to the train pipe by controlling the size of the passage 47. This arrangement is necessary so that there will be the same effect upon the train pipe in recharging a train of a few cars as there is when working a system for a large number of cars.

While the forms of the invention herein shown and described are what are believed to be preferable embodiments thereof, it is nevertheless to be understood that minor changes may be made in form proportion and details of construction without departing from the spirit and scope of the invention.

Having fully described my invention and in what manner the same is designed for use, what I claim is:—

1. An air brake system comprising means operable by an increase in pressure in the train pipe for admitting air therefrom to the auxiliary reservoir and simultaneously admitting air to the brake cylinder from the auxiliary reservoir, and a further means adapted under an increase in the train pipe pressure to admit direct air from the train pipe to the brake cylinder.

2. In a triple valve, an emergency check valve, means whereby an increase in the train pipe pressure permits the auxiliary reservoir pressure to open said check valve for the admission of direct air from the train pipe to the brake cylinder.

3. In a triple valve, a releasing trip, a main slide valve, means for engaging said trip with said slide valve, and said trip being adapted for operation by a change in pressure in the brake cylinder.

4. In a triple valve, a valve casing, a main slide valve movable therein and having a vertical transverse port therethrough, a train pipe, a brake pipe and auxiliary reservoir connections with said triple valve, and an emergency check adapted for actuation to control the admission of train pipe air to the brake pipe upon the admission of air from the auxiliary reservoir connection through said port to said check upon an increase of pressure in the train pipe.

5. In combination a triple valve comprising a casing having a chamber therein, a slide valve movably-mounted in said chamber and having ports therethrough, a piston head upon said slide valve, an auxiliary reservoir, a train pipe, said chamber communicating at its opposite ends with said train pipe and auxiliary reservoir, a brake cylinder, a conduit from said chamber communicating with said brake cylinder, and one of said ports adapted to register with said conduit whereby communication is effected between said auxiliary reservoir and brake cylinder upon either a reduction or an increase in the train pipe pressure, a conduit between said train pipe and brake cylinder, an emergency check valve positioned in said last-named conduit, the other of said transverse ports adapted upon registering with said check valve to unseat the same by effecting communication between the auxiliary reservoir and said valve whereby the train pipe pressure is directly admitted to the brake cylinder.

6. A triple valve comprising a casing having a chamber therein, a slide valve movably-mounted in said casing and having a bottom chamber therein, a brake cylinder, a conduit from said brake cylinder opening into said casing chamber, a conduit from said casing chamber opening into the atmosphere and said slide valve chamber adapted for registration with the ends of said two conduits, a catch engageable with said valve and automatically disposed in engagement therewith during the releasing of the brakes simultaneously with the registering of said chamber with said conduits.

7. A device of the class described comprising a casing having a chamber therein, a slide valve movable in said chamber and having an upper shoulder thereon, a follower head upon said valve, transverse ports through said valve, a graduating spring device located at each end of said casing adjacent said follower and valve, a self elevating spring mounted in said casing above said valve, a lug in engagement with said spring and contacting said shoulder in the running position of said slide valve.

8. A device of the class described comprising a casing having a chamber therein, a slide valve movable in said chamber and having an upper shoulder thereon, a follower head upon said valve, transverse ports through said valve, a graduating spring device located at each end of said casing adjacent said follower and valve, a self elevating spring mounted in said casing above said valve, a lug in engagement with said spring and contacting said shoulder in the running position of said slide valve, the side wall of said chamber provided with a recharging feed groove, an emergency check valve within said casing and operable upon a predetermined change of pressure in the brake pipe whereby communication is established between the train pipe and brake cylinder.

9. A device of the class described, comprising a casing having a chamber therein, a slide valve within said casing having a notch on one side thereof, said casing provided with a recess, a release check device positioned in said recess and comprising a body, a detached stem positioned in alinement with said body and adapted for engaging said notch, a spring encircling said stem and seated upon said body, a brake pipe, and a conduit between said brake pipe and recess communicating with the latter at a point below the normal level of said body.

10. In combination, a triple valve comprising a casing having a chamber therein, a slide valve within said casing, a brake cylinder, an emergency check within said casing adapted for admitting air from the train pipe to the brake cylinder, a release catch governed by the brake cylinder pressure, said catch adapted for engaging said valve in the release position of the latter.

In testimony whereof I affix my signature in presence of two witnesses.

WILLIAM E. PARKER.

Witnesses:
H. V. OLDS,
J. S. HOGUE.

Copies of this patent may be obtained for five cents each, by addressing the "Commissioner of Patents, Washington, D. C."